E. SPELLMAN.
MEASURING INSTRUMENT.
APPLICATION FILED OCT. 12, 1918.

1,295,936.

Patented Mar. 4, 1919.
2 SHEETS—SHEET 1.

INVENTOR.
Edward Spellman
BY
W. B. Munnell
ATTORNEY

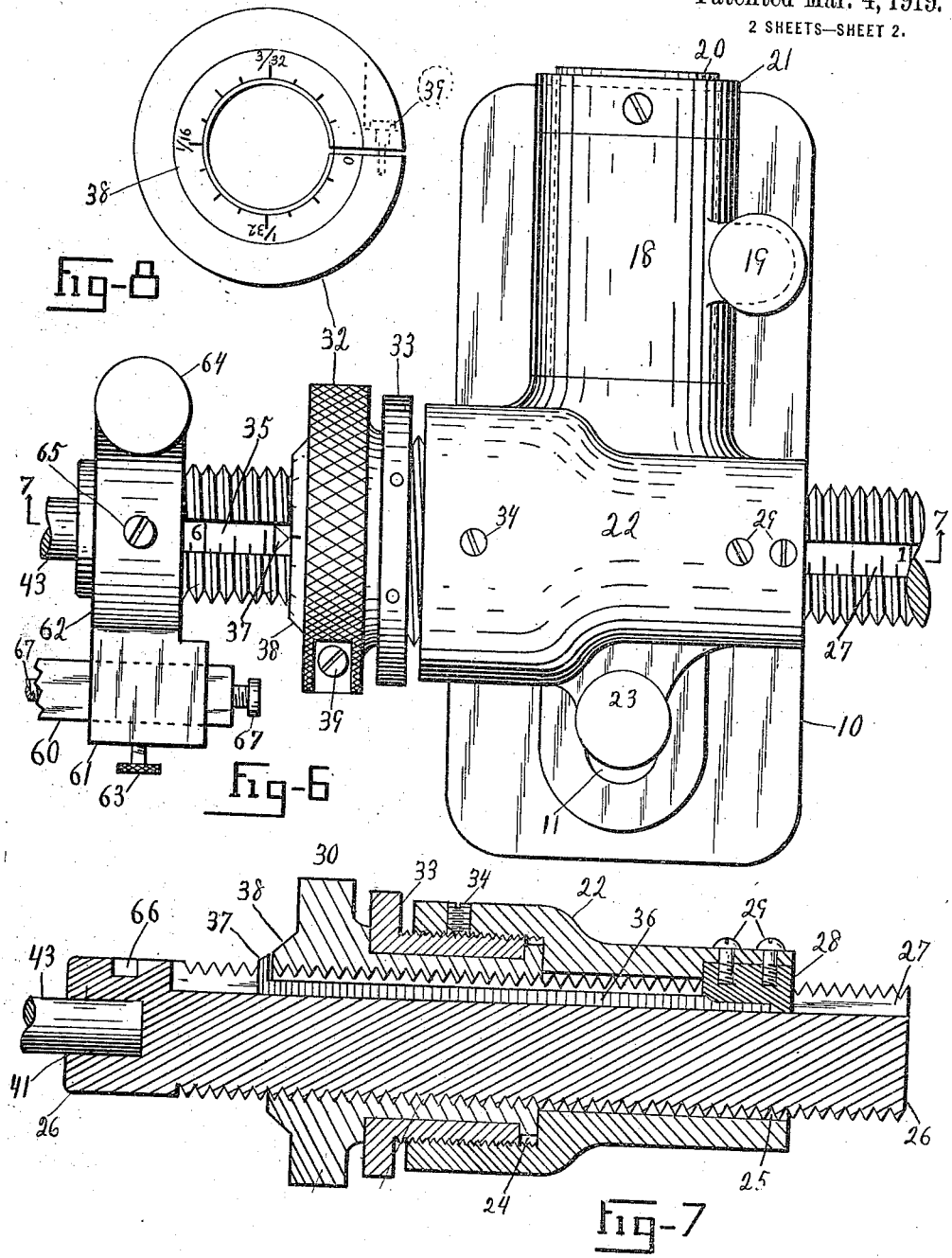

UNITED STATES PATENT OFFICE.

EDWARD SPELLMAN, OF LOUISVILLE, KENTUCKY.

MEASURING INSTRUMENT.

1,295,936.          Specification of Letters Patent.      Patented Mar. 4, 1919.

Application filed October 12, 1918. Serial No. 257,835.

*To all whom it may concern:*

Be it known that I, EDWARD SPELLMAN, a citizen of the United States, residing in the city of Louisville, county of Jefferson, and State of Kentucky, have invented a certain new and useful Measuring Instrument, of which the following is a specification.

This invention relates to means for indicating visually, by means of electricity, when an object upon which work is being performed reaches a predetermined dimension.

An object of the invention is to provide a device which when used in connection with a machine tool will give visual indications of any variance, of the "work" from a predetermined dimension.

A further object is to provide a device as characterized which may be easily manipulated, which will be accurate in operation and durable in service.

With the foregoing and other objects in view, the invention consists of the novel construction and arrangement of parts illustrated in the accompanying drawing which forms a part of this specification, wherein is set forth an embodiment of the invention, but it is to be understood that such changes and modifications may be resorted to as come within the scope of the appended claims.

Figures 1, 2, 3:
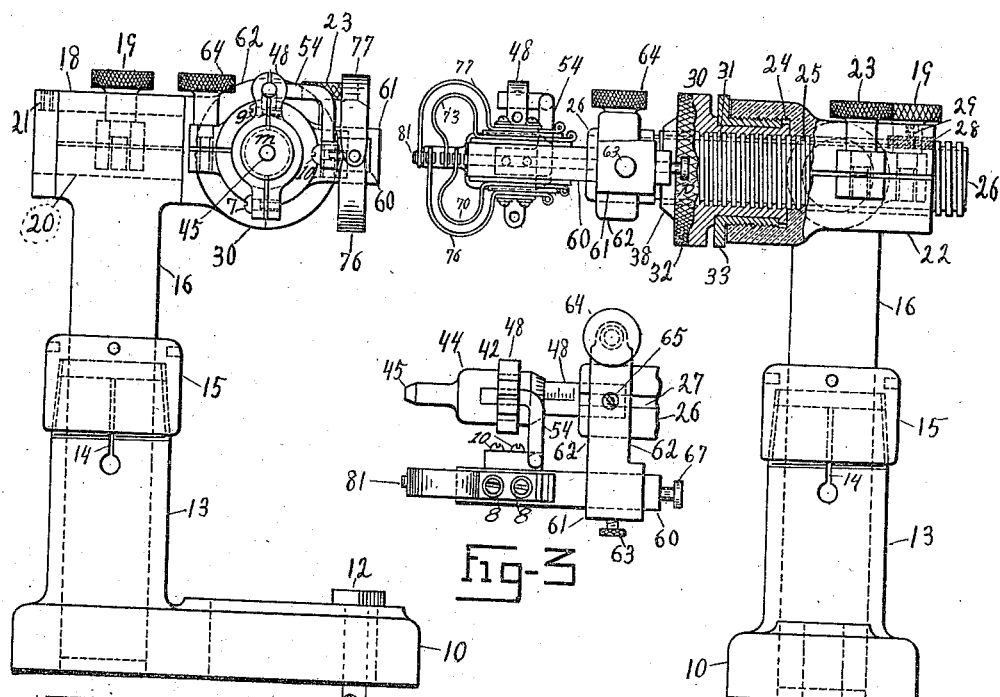
Figures 4, 5:
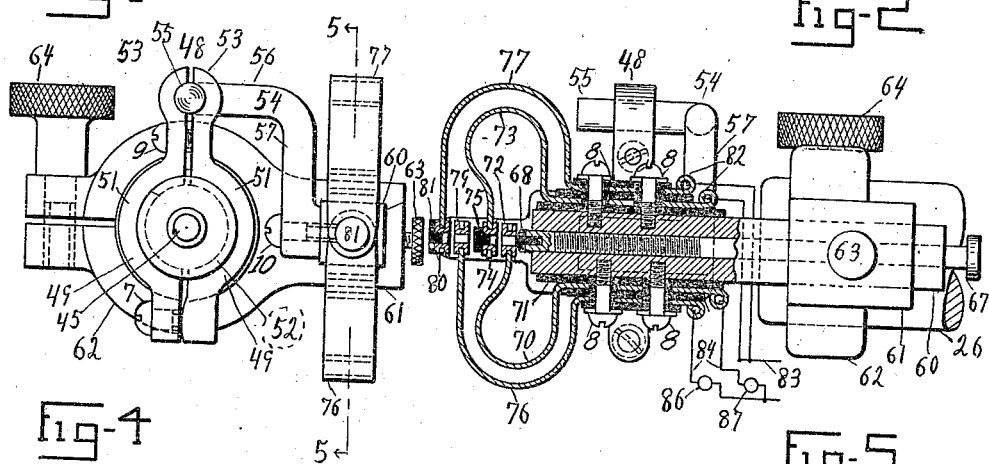

In the drawing, wherein similar reference characters designate like parts in the several views, Figure 1, is a front elevation of an embodiment of the invention; Fig. 2, a side elevation, with parts in section; Fig. 3, a top plan view of the measuring members; Fig. 4, an end elevation, on an enlarged scale, of the measuring members; Fig. 5, a sectional view, on line 5—5 of Fig. 4; Fig. 6, a top plan view, on an enlarged scale, of a portion of the device; Fig. 7, a sectional view on line 7—7 of Fig. 6; Fig. 8, a front elevation of the index head.

The embodiment of the invention illustrated herewith is designed to be mounted on the tool carriage of a lathe, or on an extension thereof. And is provided with such adjustments that the center line of its measuring points may be positioned in the same horizontal plane as the lathe center, and be moved to and from same. The device comprises a base —10— having an elongated slot —11— through which securing means such as a bolt may be passed, the slot provides means whereby the device may be adjusted to and fro as well as swung around with the bolt as a center. A hollow column —13—, erected on the base, is provided at its upper end with vertical slits —14— which permit of its being contracted by means of a nut —15—, to clamp and securely hold, a post —16— which is slidably positioned in the column. The nut is provided with holes for the application of a spanner wrench. On the upper end of the post, disposed at right angles thereto, is a split sleeve —18—, a thumb screw —19—, being provided whereby the sleeve may be contracted on a spindle —20—, which is rotatably mounted therein. A collar —21— on the end of the spindle 20 prevents its withdrawal from the sleeve. Disposed on the other end of the spindle, at right angles thereto is a split sleeve —22— which may be contracted by means of a thumb screw —23—. The sleeve —22— is provided with a major bore —24— and a minor bore —25—. A screw threaded bar, or ram —26— which is slidably mounted in the minor bore is provided with a key-way —27— which extends from its rear end to within a spaced distance of the forward end. A key —28—, fitted in the key-way at the rear end of the minor bore, and held in place by suitable means such as screws —29—, serves to prevent rotation of the ram, permitting longitudinal movement thereof only. A split sleeve, or nut —30— is threaded on the ram. This nut comprises a body portion —31—, which lies within the major bore, and an enlarged portion, or head —32— knurled on its periphery, which lies external of the bore, providing means whereby it may be rotated. A sleeve —33—, which is in screw threaded engagement with the inner wall of the major bore, provides a journal for the sleeve 30 and also means whereby wear on the screw threads of the ram 26, may be taken up. A set screw —34— provides means for securing the sleeve 33 against movement. A scale —35— is inscribed on the floor of the key-way, and a feather —36— which lies in the key-way has a pointer —37— on its forward end, which coöperates with an index —38— on the face of the head, 32, of the sleeve 30. The arrangement being such that turning the head will advance, or retract the ram, 26. One complete turn of the head moving the ram a definite distance, of say ⅛ of an inch, fractional distances of less than that amount being obtained by observing the index on the head. When adjusted, the sleeve 30, may be locked in position by means of a screw —39—. The forward end of the ram is provided with a socket —41—, for the reception of the shank of a micrometer gage —42—, said gage comprising a shank —43— and a head —44— which is provided with a point —45—. It is thought that the construction of micrometers is well enough known not to need extended description here, suffice to say that the head is connected with the shank by means of a fine screw-thread, and that an annular index on the head, coöperates with a scale arranged longitudinally on the shank, the two being decimally sub-divided. A clamp —48—, carried on the head 44 comprises two opposed members —49—, which are connected at their lower ends by means of a screw —7— (see Fig. 4). These members have central semi-circular portions —51— which fit about the head, being received in an annular groove —52—. The arrangement being such that the head may be turned without influencing the clamp, or vice versa. The members 49, are also provided with terminal semi-circular portions —53— which form a bearing for and are adapted to clamp and securely hold an angular arm —54—. A screw —9— serves to clamp the members 49 about the arm 54, this screw may be loosened sufficiently to permit movement of the arm without affecting the relationship of the clamp to the micrometer head. The arm 54 comprises three sections —55, 56, 57— disposed at right angles to each other, the first named section extending longitudinally of and in a horizontal plane parallel with the shank, and being adapted to slide between the parts 53, the second section extends at right angles from the first section, in the same plane therewith, the third section extends at right angles from the second in a vertical plane, the free end of the third section is secured by screws —10— to a rectangular bar —60—. This bar extends parallel with the shank of the micrometer in the same horizontal plane therewith and is slidably mounted in a part —61—, which projects from a split collar —62—, and may be secured against movement therein by means of a thumb screw —63—. This collar 62, is positioned on the forward end of the ram, 26, and may be clamped thereon by means of a thumb screw —64— (see Fig. 6). A set screw —65— which extends through the collar 62, into an annular groove —66—, which extends half way around the circumference of the ram, serves to prevent longitudinal movement of the collar thereon, and also to limit its circumferential travel thereabout, to a half revolution. The arrangement being such that by loosening the screws 9 and 63, the bar may be adjusted longitudinally relative to the micrometer, the first section of the arm 54 sliding in the clamp 48,
and the bar 60, sliding in the part 61, by loosening the screw 63 only, the bar 60 and its attachments will move as a unit with the micrometer head, and by loosening the screw 9 only, the micrometer head may be moved without moving the bar 60. A threaded rod —67— which extends longitudinally through the bar is provided on its forward end with a button —68— of yielding material such as soft rubber. A spring —70— (see Fig. 5) is disposed on the under side of the bar 60, longitudinally thereof, at the forward end thereof, suitable insulating material —71— such as hard rubber or fiber being placed between the spring and the bar. At a point near the forward end of the bar, the spring is bent outward at right angles thereto and extends therefrom a spaced distance, it is then doubled back terminating in the center line of the bar, if extended. Secured on the end of the spring, is a contact disk —72— which lies in front of and a spaced distance from the button 66. A similarly shaped spring —73— is disposed on the upper side of the bar, a terminal contact disk —74— thereon lying a spaced distance in front of the disk 72 with which it is adapted to make electrical contact. Attached to the front of the disk 74 is a disk —75— of hard rubber or other suitable insulating material. A pair of springs —76, 77— are disposed respectively over the springs 70 and 73, being suitably insulated therefrom. The assemblage of springs is secured to the bar by suitable means such as screws —8—. The springs 76, 77 are substantially parallel therewith through nearly their entire length. A contact disk —79— on the end of the spring 76, lies a spaced distance in front of the disk 75, and a contact disk —80— on the end of the spring 77 lies just in front of the disk 79. The disk 80 is faced with a layer —81— of insulation which bears against the work, when the tool is in service, and insulates the spring from the work. Each of the springs is provided, on its rear end, with means such as a loop —82— to which electrical conductors are attached, certain of which as —83— lead direct to a source of electrical current, while others as —84— lead through lamps —86, 87—. The arrangement being such that when the disks 79 and 80 are in contact the lamp 86 will be lighted, and when the disks 72 and 74 are in contact, the lamp 87 will be lighted. The device is installed for use on a lathe by being attached to the tool carriage by means of the bolt 12, the nut 15 is then loosened, the post 16 adjusted, up or down, until the center line of the ram, 26, if extended would intersect the lathe center in a horizontal plane and then the nut tightened. The ram 26 is then extended, by manipulating the nut 30, to its fullest extent and the device adjusted by swinging about the bolt 12, or by turning the post 16 in the column 13, or both, until the ram 26 is at right angles to the lathe center and the tips of the points 45 and 81 lie in the lathe center. The bar is then retracted until the scale 35 indicates the desired dimensions (in Fig. 6, the scale indicates that the points are 5 and ⅜ inches plus $\frac{1}{16}$, on the index 38, from the lathe center) the scale as illustrated indicates the radius of the work to be turned, it is obvious that the scale may be arranged to give the diameter direct. When the measuring head is not in use it may, by loosening the thumb screw 19, thus releasing the spindle 20, be turned through a vertical plane, back out of the way. When the point 81 is pressing against the work the springs are all flexed, the disks 72, 74, and 79 and 80, being in contact and both lights, 86 and 87 burning. As the work is reduced, the tension of the springs relaxes by reason of the point following the work; when the desired size, for which the tool has been set, is reached the disk 72 separates from the disk 74 and the light 87 will go out thus indicating the fact. Further reduction in size of the work will result in the separation of the disks 79, 80 and the light 86 will go out thus indicating that the work is undersize. These lights may be located in any position desired, or lights may be placed at more than one point. The distance through which the springs move backward may be controlled by means of the rod 65, which extends through the bar 60, advancing the bar limits the flexure and vice versa.

One method of using the device is, in starting a piece of work, to "size" same by means of a master gage, the contact points are then advanced to contact with the sized portion, then with the screw 63 tightened, the screw 9 is loosened, and the micrometer head is retracted, so that the spring contacts only are in service.

As illustrated, the micrometer head travels along the work, ahead of the spring contacts, on occasions it may be desired that the springs travel ahead, in which case by loosening the screw 64 the bar 60 with its attachments may be turned through an arc of 180 degrees, the clamp 48, turning on the head of the micrometer and the collar 62, turning on the head of the ram 26.

The measuring heads may be swung upward on the spindle 20, only being brought down occasionally for trial measurements.

While I have shown and described in considerable detail one specific embodiment of my invention, it is to be understood that such showing is illustrated only and that I do not regard my invention as limited to details shown or described nor to any of them except in so far as such limitations have been included in the terms of the following claims in which it is my intention to claim all novelty inherent in the invention as broadly as is possible in view of the prior art.

What I claim is:

1. In a device as characterized, a support, a measuring element carried thereby, electric contacts carried by said element, an electric circuit, said contacts adapted to be closed by contact with an article to be measured.

2. In a device as characterized, a support, a measuring element carried thereby, an electric circuit, circuit closing means carried by said element, said means adapted to be actuated to close the circuit by contact with an object to be measured, and indicating devices in said circuit.

3. In a device as characterized, a support, a measuring element carried thereby and extensible therefrom, a plurality of electric circuits, circuit closing means in each of said circuits carried by said element, said means adapted to be closed *seriatim* by contact with the object to be measured, and an indicating device in each circuit.

4. In a device as characterized, a support, a measuring element carried thereby, electric contacts arranged in tandem on said element, an electric circuit, said contacts adapted to be closed by contact with the article to be measured.

5. In a device as characterized, a support, a measuring element carried thereby, an electric circuit, circuit closing means carried by said element, said means adapted to be actuated by contact with an object to be measured to close the circuit, and an electric light in said circuit.

6. In a device as characterized, a support, a measuring element carried thereby and extensible therefrom, a plurality of electric circuits, circuit closing means in each of said circuits, said means adapted to be closed *seriatim* by contact with the object to be measured, and an electric light in each circuit.

7. In a device as characterized, a support, a measuring element extensible therefrom, springs attached to said element and adapted to be flexed by contact with an object to be measured, an electric circuit adapted to be closed by the springs when flexed, and an indicating device in the circuit.

8. In a device as characterized, a support, a measuring element extensible therefrom, springs attached to said element and adapted to be flexed by contact with an object to be measured, an electric circuit, a contact in said circuit adapted to be closed when the springs are flexed, and an electric light in the circuit.

9. In a device as characterized, a support, a measuring element extensible therefrom, a plurality of springs attached to said element and adapted to be flexed *seriatim* by contact with the object to be measured as the element is advanced, a plurality of electric circuits, a contact in each of said circuits adapted to be closed by the springs when flexed, and an electric light in each circuit.

10. In a device as characterized, a support, a measuring element extensible therefrom, a plurality of springs attached to said element, and adapted to be flexed *seriatim* by contact with the object to be measured as the element is advanced, a plurality of electric circuits, a contact in each of said circuits adapted to be closed by the springs when flexed, and an indicating device in each circuit.

11. In a device as characterized, a base, a hollow column erected thereon, a post slidably and rotatably mounted therein, a sleeve disposed on the upper end of the post at right angles thereto, a spindle rotatably positioned in said sleeve, a sleeve on the end of said spindle at right angles thereto, a bar slidably mounted in the last mentioned sleeve, means for actuating said bar, a resilient element associated with said bar and adapted to yield on contact with an object when the bar is advanced, an electric circuit, a contact in said circuit adapted to be closed by said element and a light in the circuit.

12. In a device as characterized, a base, a hollow column erected thereon, a post slidably and rotatably mounted therein, a sleeve disposed on the upper end of the post at right angles thereto, a spindle rotatably positioned in said sleeve, a sleeve on the end of said spindle at right angles thereto, said sleeve having a major and a minor bore, a screw threaded bar slidably positioned in said minor bore, said bar having a keyway extending longitudinally thereof, a nut threaded on the bar and rotatably retained within the major bore, springs associated with the bar and adapted to be flexed on contact with an object when the bar is advanced, electric circuits, contacts in said circuits adapted to be closed by the flexure of said springs and lights in the circuits.

13. In a device as characterized, a support, a measuring element carried thereby, electric contacts carried by said element, an electric circuit, said contacts adapted to be closed by contact with an article to be measured, and an indicating device adapted to be actuated by the closing of the circuit.

14. In a device as characterized, a support, an extensible measuring element carried thereby, an electric circuit, circuit closing means in said circuit adapted to be actuated by contact of the measuring element with an object to be measured.

15. In a device as characterized, a support, an extensible measuring element carried thereby, an electric circuit, circuit closing means in said circuit adapted to be actuated by contact of the measuring element with an object to be measured, and an indicating means in the circuit.

16. In a device as characterized, a support, a measuring element carried thereby, electric contacts arranged in tandem on said element, an electric circuit, said contacts adapted to be closed by contact with the article to be measured, and an indicating device in said circuit.

17. In a device as characterized, a support, an extensible measuring element carried thereby, an electric circuit adapted to be closed by contact of the measuring element with an object to be measured and an indicating device in said circuit.

18. In a device as characterized, a support, a measuring element carried thereby, an electric circuit, an indicating device in said circuit, and means controlling said circuit adapted to be actuated by contact of the measuring element with an object to be measured.

19. In a device as characterized, a support, a measuring element carried thereby, an electric circuit, an indicating device in said circuit, and circuit controlling means carried by said element and adapted to be actuated by contact with an object to be measured.

EDWARD SPELLMAN.

Copies of this patent may be obtained for five cents each, by addressing the "Commissioner of Patents, Washington, D. C."